US010992530B2

(12) United States Patent
Redkina et al.

(10) Patent No.: US 10,992,530 B2
(45) Date of Patent: Apr. 27, 2021

(54) DASHBOARD OVERVIEW NAVIGATION AND SEARCH SYSTEM

(71) Applicant: ServiceNow, Inc., Santa Clara, CA (US)

(72) Inventors: Olga Redkina, Amsterdam (NL); Anita Lugomer, Amsterdam (NL); Silvia Mihit, Almere (NL); Dushyant Sabharwal, Amsterdam (NL); Vishal Narkhede, Amsterdam (NL); Stefaan Vandenbussche, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 239 days.

(21) Appl. No.: 15/792,513

(22) Filed: Oct. 24, 2017

(65) Prior Publication Data

US 2019/0102071 A1 Apr. 4, 2019

Related U.S. Application Data

(60) Provisional application No. 62/568,087, filed on Oct. 4, 2017.

(51) Int. Cl.
*G06F 3/0482* (2013.01)
*H04L 12/24* (2006.01)
(Continued)

(52) U.S. Cl.
CPC ........ *H04L 41/0859* (2013.01); *G06F 3/0481* (2013.01); *G06F 3/0482* (2013.01); *G06F 3/0486* (2013.01); *G06F 3/04847* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/14* (2013.01); *G06F 11/3006* (2013.01); *G06F 11/3452* (2013.01); *G06F 16/248* (2019.01); *G06F 16/2423* (2019.01); *G06F 16/24578* (2019.01); *G06F 16/27* (2019.01); *G06F 16/30* (2019.01); *G06F 16/904* (2019.01); *G06F 16/951* (2019.01); *G06F 40/18* (2020.01); *G06F 40/186* (2020.01); *G06Q 10/067* (2013.01);
(Continued)

(58) Field of Classification Search
CPC .................................................... G06F 3/0482
USPC ........................................................ 715/764
See application file for complete search history.

(56) References Cited

U.S. PATENT DOCUMENTS

6,609,122 B1 8/2003 Ensor
6,816,898 B1 11/2004 Scarpelli
(Continued)

*Primary Examiner* — Daniel Rodriguez
(74) *Attorney, Agent, or Firm* — Fletcher Yoder, P.C.

(57) ABSTRACT

Systems and methods for a dashboard overview showing dashboards available for a user, a visual key of available dashboards and simplified access to most recently used dashboards are disclosed. A dashboard represents a user-defined display of key performance indicators (KPIs) in a manner perceived convenient by the user creating the dashboard. As dashboards have evolved a sharing aspect of dashboards has been determined to be a mechanism to promote reuse of dashboards. Including a visual clue on a dashboard selection page as to the underlying display presentation method has been determined to be an important aid in allowing for navigation amongst a plurality of dashboards available in an enterprise system. Sharing and retrieval techniques for dashboards are disclosed.

20 Claims, 6 Drawing Sheets

(51) Int. Cl.

| | | |
|---|---|---|
| G06F 9/50 | (2006.01) | |
| G06F 9/48 | (2006.01) | |
| G06F 9/46 | (2006.01) | |
| H04L 29/08 | (2006.01) | |
| H04L 29/06 | (2006.01) | |
| G06F 11/14 | (2006.01) | |
| G06F 40/18 | (2020.01) | |
| G06F 40/186 | (2020.01) | |
| G06F 16/951 | (2019.01) | |
| G06F 9/54 | (2006.01) | |
| G06F 9/451 | (2018.01) | |
| G06F 16/27 | (2019.01) | |
| G06F 16/2457 | (2019.01) | |
| G06F 16/242 | (2019.01) | |
| G06F 16/248 | (2019.01) | |
| G06F 11/30 | (2006.01) | |
| G06F 11/34 | (2006.01) | |
| G06F 3/0486 | (2013.01) | |
| G06Q 10/06 | (2012.01) | |
| G06Q 30/06 | (2012.01) | |
| H04L 12/26 | (2006.01) | |
| G06F 3/0484 | (2013.01) | |
| G06Q 30/00 | (2012.01) | |
| G06Q 50/18 | (2012.01) | |
| G06F 16/904 | (2019.01) | |
| G06Q 40/00 | (2012.01) | |
| G06F 16/30 | (2019.01) | |
| G06F 3/0481 | (2013.01) | |
| G06F 9/445 | (2018.01) | |
| G06F 21/53 | (2013.01) | |
| G06F 21/57 | (2013.01) | |

(52) U.S. Cl.
CPC ... *G06Q 10/0635* (2013.01); *G06Q 10/06314* (2013.01); *G06Q 10/06315* (2013.01); *G06Q 10/06393* (2013.01); *G06Q 30/018* (2013.01); *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 43/045* (2013.01); *H04L 43/08* (2013.01); *H04L 43/50* (2013.01); *H04L 63/10* (2013.01); *H04L 63/1433* (2013.01); *H04L 63/20* (2013.01); *H04L 67/26* (2013.01); *H04L 67/32* (2013.01); *G06F 3/0484* (2013.01); *G06F 9/44505* (2013.01); *G06F 21/53* (2013.01); *G06F 21/577* (2013.01); *H04L 41/0879* (2013.01); *H04L 67/12* (2013.01); *H04L 67/34* (2013.01)

(56) References Cited

U.S. PATENT DOCUMENTS

| | | | |
|---|---|---|---|
| 6,823,384 B1 * | 11/2004 | Wilson | H04L 29/06 379/265.02 |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,069,153 B2 * | 11/2011 | Chan | G06F 21/554 707/691 |
| 8,224,486 B2 | 7/2012 | Manos | |
| 8,255,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,031,223 B2 * | 5/2015 | Smith | H04M 3/5175 379/265.09 |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,658,738 B1 * | 5/2017 | Park | G06F 3/0481 |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 2005/0289117 A1 * | 12/2005 | Hiraishi | G06F 16/958 |
| 2007/0101297 A1 * | 5/2007 | Forstall | G06F 3/0482 715/841 |
| 2008/0034314 A1 * | 2/2008 | Louch | G06F 3/0481 715/778 |
| 2008/0104535 A1 * | 5/2008 | DeLine | G06F 3/0483 715/785 |
| 2008/0298697 A1 * | 12/2008 | Lee | G06F 3/04817 382/243 |
| 2009/0024944 A1 * | 1/2009 | Louch | G06F 9/451 715/765 |
| 2010/0185650 A1 * | 7/2010 | Topatan | G06F 21/6218 707/769 |
| 2011/0087661 A1 * | 4/2011 | Quick | G06F 16/435 707/732 |
| 2011/0302221 A1 * | 12/2011 | Tobin | G06F 16/24575 707/805 |
| 2013/0031499 A1 * | 1/2013 | Vishnubhatta | G06Q 10/08 715/765 |
| 2013/0179880 A1 * | 7/2013 | Edholm | G06F 9/5083 718/1 |
| 2014/0015846 A1 * | 1/2014 | Campbell | G09G 5/391 345/589 |
| 2014/0092096 A1 * | 4/2014 | Breedvelt-Schouten | G06T 11/20 345/441 |
| 2014/0199045 A1 * | 7/2014 | Lee | G11B 27/034 386/240 |
| 2014/0201131 A1 * | 7/2014 | Burman | G06F 40/10 707/608 |
| 2014/0208215 A1 * | 7/2014 | Deshpande | G06Q 10/00 715/736 |
| 2014/0245214 A1 * | 8/2014 | Singh | G06F 3/0484 715/780 |
| 2014/0288971 A1 * | 9/2014 | Whibbs, III | G06Q 10/10 705/3 |
| 2014/0298259 A1 * | 10/2014 | Meegan | G06F 3/04817 715/810 |
| 2015/0120814 A1 * | 4/2015 | Son | H04L 67/42 709/203 |

(56) References Cited

U.S. PATENT DOCUMENTS

| | | | |
|---|---|---|---|
| 2015/0143211 A1* | 5/2015 | Kaufthal | G06F 40/134 |
| | | | 715/205 |
| 2015/0143216 A1* | 5/2015 | Huang | G06F 40/134 |
| | | | 715/208 |
| 2015/0172329 A1* | 6/2015 | Wong | H04L 65/403 |
| | | | 715/753 |
| 2015/0193418 A1* | 7/2015 | Koska | G05B 19/0426 |
| | | | 715/223 |
| 2015/0212717 A1* | 7/2015 | Nair | G06F 9/451 |
| | | | 715/769 |
| 2015/0310110 A1* | 10/2015 | Nandakumar | G06F 16/951 |
| | | | 707/737 |
| 2016/0246490 A1* | 8/2016 | Cabral | G06F 3/0481 |
| 2016/0378302 A1* | 12/2016 | Gilger | G06Q 10/067 |
| | | | 715/736 |
| 2017/0024393 A1* | 1/2017 | Choksi | G06F 16/24578 |
| 2017/0041296 A1* | 2/2017 | Ford | H04L 63/0421 |
| 2017/0075919 A1* | 3/2017 | Bose | G06F 21/6245 |
| 2017/0134381 A1* | 5/2017 | Abdelhamed | H04L 63/10 |
| 2017/0235436 A1* | 8/2017 | Hooton | G06F 3/0486 |
| | | | 705/7.11 |
| 2017/0300712 A1* | 10/2017 | Timmerman | G06F 16/23 |
| 2018/0004823 A1* | 1/2018 | Kakhandiki | G06F 16/2455 |
| 2018/0032216 A1* | 2/2018 | Naous | G06Q 10/0639 |
| 2018/0032941 A1* | 2/2018 | Naous | G06Q 10/067 |
| 2018/0034685 A1* | 2/2018 | Naous | H04L 41/22 |
| 2018/0143947 A1* | 5/2018 | Jain | G06F 40/106 |
| 2018/0285756 A1* | 10/2018 | Dunwoody | G06N 5/047 |
| 2018/0353108 A1* | 12/2018 | Prate | H04L 67/22 |
| 2019/0114694 A1* | 4/2019 | Horimoto | G06F 16/958 |

* cited by examiner

DASHBOARD OVERVIEW NAVIGATION AND SEARCH SYSTEM

RELATED CASES

This application claims priority to and benefit of U.S. Provisional Patent Application Ser. No. 62/568,087, filed Oct. 4, 2017, entitled "Platform Computing Environment and Functionality thereof," by Amradkar, et. al, for all applicable purposes, including a right of priority, the contents of which are incorporated by reference herein, in their entirety.

TECHNICAL FIELD

Embodiments described herein generally relate to enterprise computing and, in particular, to providing a dashboard overview navigation and search system. Dashboards have become an important presentation method for enterprise level applications. Management and sharing of user-defined and other types of dashboard displays across an enterprise computing system are described.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, dashboard style displays have become an important tool for users to understand complexities of performance of underlying infrastructure and applications within an enterprise. Dashboard displays may be user-defined and display a set of key performance indicators (KPIs) in an "at a glance" view. Because dashboards may be user-defined and may be created in an ad-hoc manner, the usability, sharing, and organization of dashboards may present issues at an enterprise level. Also, dashboards specifically designed for re-use across groups of an organization may need to be properly advertised (e.g., made known and available) within the organization to allow users to benefit from their availability. The disclosed techniques for managing, sharing, searching, and navigating amongst a plurality of user-defined dashboards represent improvements to address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example embodiments of applications and functions include software modules, software objects, software instances and/or other types of executable code.

Dashboards often provide at-a-glance views of KPIs (key performance indicators) relevant to a particular objective or business process (e.g., sales, marketing, human resources, or production). Often, the "dashboard" is displayed on a web page that is linked to one or more underlying databases and may allow for data to be continuously updated in a near real-time manner. For example, a manufacturing dashboard may show numbers related to productivity such as number of parts manufactured, or number of failed quality inspections per hour. Similarly, a human resources dashboard may show numbers related to staff recruitment, retention and composition, for example the number of open positions, or average days or cost per recruitment. The term dashboard originates from the automobile dashboard where drivers monitor the major functions and metrics of a vehicle at a glance via the instrument cluster.

In the context of computing systems (including desktop, enterprise, and cloud computing systems), dashboard displays allow managers and end-users to monitor the contribution of the various departments in their organization. To gauge exactly how well an organization or information technology systems are performing overall, digital dashboards may be configured to allow the user to capture and report specific data points from each department or infrastructure component within the enterprise, thus providing a "snapshot" of overall performance. Some benefits of dashboard style displays include but are not limited to: visual presentation of performance measures, ability to identify and correct negative trends, measure efficiencies/inefficiencies, ability to generate detailed reports showing new trends, ability to make more informed decisions based on collected business intelligence, align strategies and organizational goals, save time compared to running multiple reports, gain total visibility of all systems in a centralized view, quick identification of data outliers and correlations.

In some embodiments, dashboards may be grouped according to role and may be considered based on a usage type, for example, strategic, analytical, operational, informational, etc. Strategic dashboards may support managers at any level in an organization, and provide the quick overview that decision makers need to monitor the health and opportunities of a business. Dashboards of a strategic type may focus on high level measures of performance and forecasts. Strategic dashboards may benefit from static snapshots of data (daily, weekly, monthly, and quarterly) that are not constantly changing from one moment to the next. Dashboards for analytical purposes often include more context, comparisons, and history, along with subtler performance evaluators. Analytical dashboards typically support interactions with the data, such as drilling down into the underlying details of a displayed metric. Dashboards for monitoring operations are often designed differently from those that support strategic decision making or data analysis and often require monitoring of activities and events that are constantly changing and might require attention and response at a moment's notice. Disclosed techniques for management and sharing of dashboards, including the disclosed dashboard overview capability are intended to function with all dashboard types and roles.

In certain embodiments, digital dashboards may be laid out to track the flows inherent in the business processes that they monitor. Graphically, users may see the high-level processes and then drill down into lower level data. This level of detail previously may have been buried deep within the corporate enterprise and otherwise unavailable to senior executives. For example, because it was stored in multiple distinct databases or would have otherwise not been correlated in a similar manner as allowed via a dashboard.

At least three types of digital dashboards are known in the enterprise systems of today including stand-alone software applications, web-browser based applications, and desktop applications also known as desktop widgets. In some cases, a widget engine is used to drive the dashboard design and display. Disclosed embodiments for management, organization, maintenance, and search capabilities may be designed to work with any type of digital dashboard available today or in the future. Specialized dashboards may track all corporate functions. Examples include human resources, recruiting, sales, operations, security, information technology, project management, customer relationship management and many more departmental dashboards. For a smaller organization, like a startup, a compact startup scorecard dashboard may be configured to track important activities across multiple domains ranging from social media to sales. In some enterprises, digital dashboard projects involve business units as the driver and the information technology department as the enabler. The success of digital dashboard projects often depends on the metrics that were chosen for monitoring. Key performance indicators, balanced scorecards, and sales performance figures are some of the content appropriate on business dashboards.

Balanced Scorecards and Dashboards have been linked together as if they were interchangeable. However, although both visually display critical information, the difference is in the format: Scorecards can provide a view as to the quality of an operation while dashboards provide calculated direction. A balanced scorecard has what may be called a "prescriptive" format. In order to satisfy requirements of a balanced scorecard, the balanced scorecard should always contain several components for an active strategy including: Perspectives—groupings of high level strategic areas, Objectives—verb-noun phrases pulled from a strategy plan, Measures—also called Metric or Key Performance Indicators (KPIs), and Spotlight Indicators such as red, yellow, or green symbols that provide an at-a-glance view of a measure's performance. Inclusion of each of these sections may ensure that a Balanced Scorecard is connected to the businesses critical strategic needs. Disclosed techniques for management, organization, maintenance, and search capabilities may be designed to work with both dashboards and balanced scorecards. In the context of this disclosure, a balanced scorecard may be considered a subclass of dashboards.

The design of a dashboard may be more loosely defined than balanced scorecards. Dashboards typically include a series of graphics, charts, gauges or other visual indicators that can be monitored and interpreted. Even when there is a strategic link on a dashboard, it may not be noticed as such because objectives may not normally be present on dashboards. However, dashboards can be customized to link their visual elements to strategic objectives and may be designed to include one or more components of a balanced scorecard.

The disclosed dashboard overview page (see the discussion below) may address organization and maintenance issues associated with dashboard displays within an enterprise by providing a convenient collection point for navigating to and sharing dashboards across a plurality of end-users. Among other attributes, disclosed embodiments of the dashboard overview page provide visibility of available dashboards, shortcut access to a set of most recently used dashboards (recent parameter may be tunable), and improved search of the dashboards by type, title, group, etc. Additionally, in some embodiments, a dashboard overview page includes a card view of each dashboard and possibly the ability to share a dashboard with other users. The card view may be designed with a title, group, owner, and an auto-generated thumbnail view representative of the content and layout of the underlying dashboard. This thumbnail view may allow for better visual recognition by users across dashboards that may have substantially similar text based attributes (e.g., similar names, same group, same owner). When hovering over a card view in the dashboard overview display additional information describing details of the underlying dashboard may be presented in a pop-up style display to further assist users in identifying to which dashboard they wish to navigate.

In some embodiments, metrics associated with dashboard usage may be collected and saved for future dashboard administration. For example: how often each dashboard is used; when a dashboard was used last time and by whom; total number of distinct users that have viewed a dashboard; age of dashboard; total number of distinct user groups that have used a dashboard; etc. Using collected metric information reflecting use, a system based process or an administrator may be able to identify dashboards that are of little use or those that may be considered mission critical. Obviously, unused dashboards may be deleted and more prevalently used dashboards may be considered for inclusion into upgrade and testing procedures to ensure their continued availability. Further information about a dashboard overview landing page with search capability and dashboard maintenance techniques is discussed below with reference to FIGS. 3-5.

Figure 1:
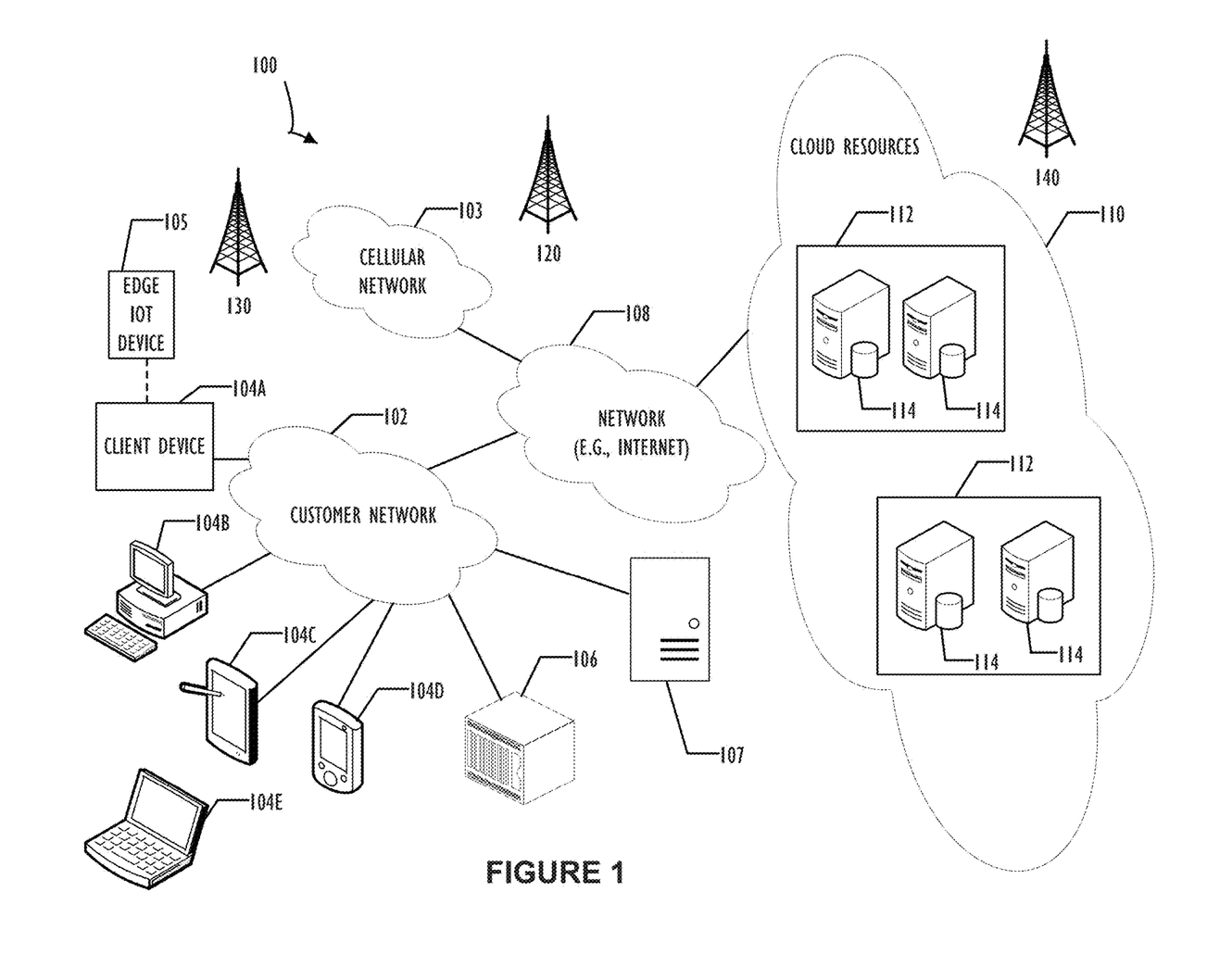
FIG. 1 illustrates a block diagram of an embodiment of a cloud computing infrastructure 100 where embodiments of the present disclosure may operate.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

Figure 2:
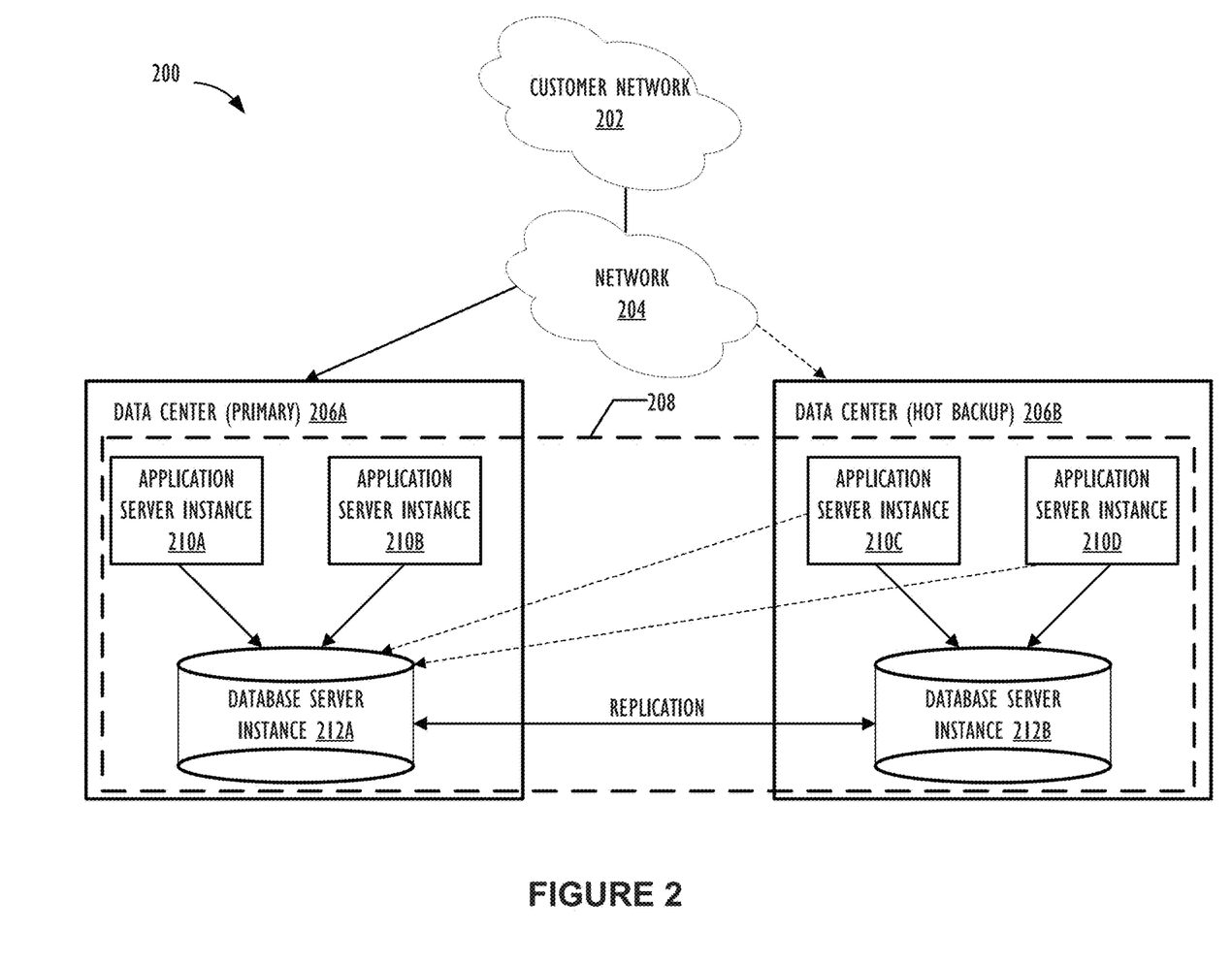
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example, a customer instance 208 is composed of four dedicated application server instances 210A-210D and two dedicated database server instances 212A and 212B. Stated another way, the application server instances 210A-21.0D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206A and 206B may act as a backup data center. In reference to FIG. 2, data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master My SQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if application server instances 210A and 210B and/or primary data server instance 212A fails and/or is under maintenance, data traffic for customer instances 208 can be diverted to secondary application server instances 210C and 210D and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210A-210D and database server instances 212A-212B can be combined into a single server instance. The use and discussion of FIGS. 1 and 2 are only examples to facilitate ease of description and explanation.

Figure 3:
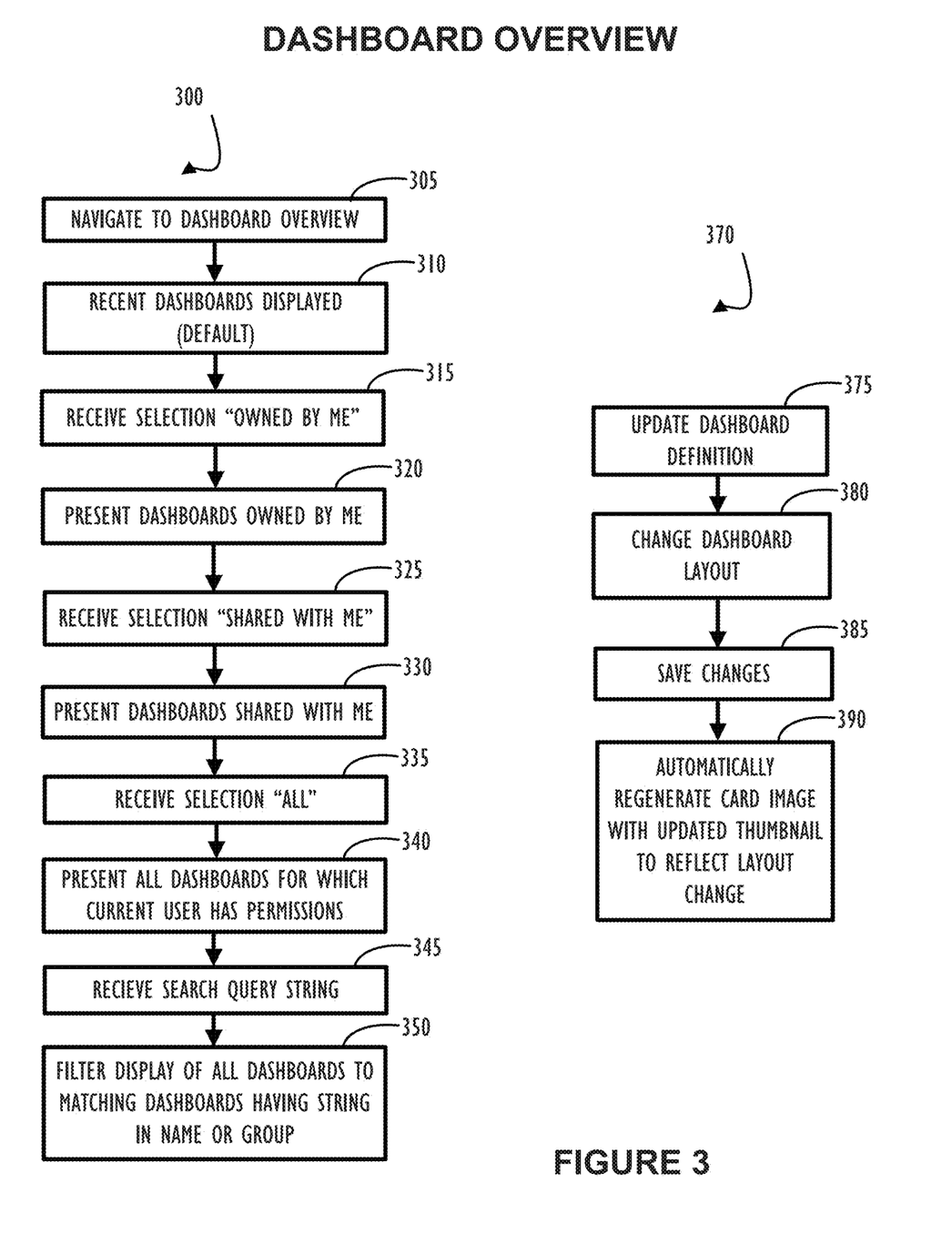
FIG. 3 illustrates two flow diagrams 300 and 370 for possible embodiments of a system to create, maintain, and share dashboard displays throughout an enterprise according to the present disclosure.

Referring now to FIG. 3, two flow diagrams 300 and 370 are illustrated. Each of flow diagrams 300 and 370 represent operations may be separately or jointly applicable to different disclosed embodiments for creating, maintain, and sharing a user-defined dashboard display interface according to the present disclosure. Operation 300 begins at block 305 where the system is directed to navigate to a dashboard overview display (see screen shot 400 of FIG. 4). At block 310, a set of recently viewed dashboards may be identified and card style tiles (e.g., a card info view) may be presented (as a default in this example) on a display device communicatively coupled to the system. The dashboard overview display may have several selection tabs including owned by me, shared with me, recently viewed, and all. At block 315 the system receives a request (e.g., via activation of selection box or tab) to navigate to all dashboards "owned by me." Responsive to the request, at block 320, a set of card info tiles representative of all dashboards owned by the current end-user may be displayed. At block 325, the system may receive a request to navigate to all dashboards "shared with me." Responsive to the request, at block 330, a set of card info tiles representative of all dashboards shared with the current end-user may be displayed. At block 335, the system may receive a request to navigate to "all" dashboards (that they have permissions to see). Responsive to the request, at block 340, a set of card info tiles representative of all dashboards the current user has access to may be displayed. Finally, at block 345, a search string from a search string query box (See screen shot 500 element 505) may be received by the system. Responsive to the search entry, at block 350, a set of card info tiles representative of all dashboards matching the search criteria in either the title or group may be displayed.

Flow 370 of FIG. 3 represents a process whereby a portion of the card tile info representative of the underlying dashboard contents and design may be maintained. For example, in a thumbnail portion (element 435 of FIG. 4) of the card info tile. As discussed above, a visual representation of the underlying dashboard layout as part of the card info tile may assist a user in visual recognition of the dashboard display to which they are trying to navigate. In some embodiments, the thumbnail portion of the card info tile includes a set of widgets from the top of the underlying dashboard definition and may be automatically kept accurate (e.g., by process 370). Beginning at block 375, updated a dashboard definition is obtained by a system. For example, as shown at block 380, there may be a change the dashboard layout that include a new widget as part of the display. At block 385, that changes made to the dashboard are saved by the system. Responsive to the update and save operation, block 390 indicates that the system may automatically regenerate a card image (e.g., card tile info) with an updated thumbnail portion (435 of FIG. 4) to reflect the layout change made to the underlying dashboard.

Figure 4:
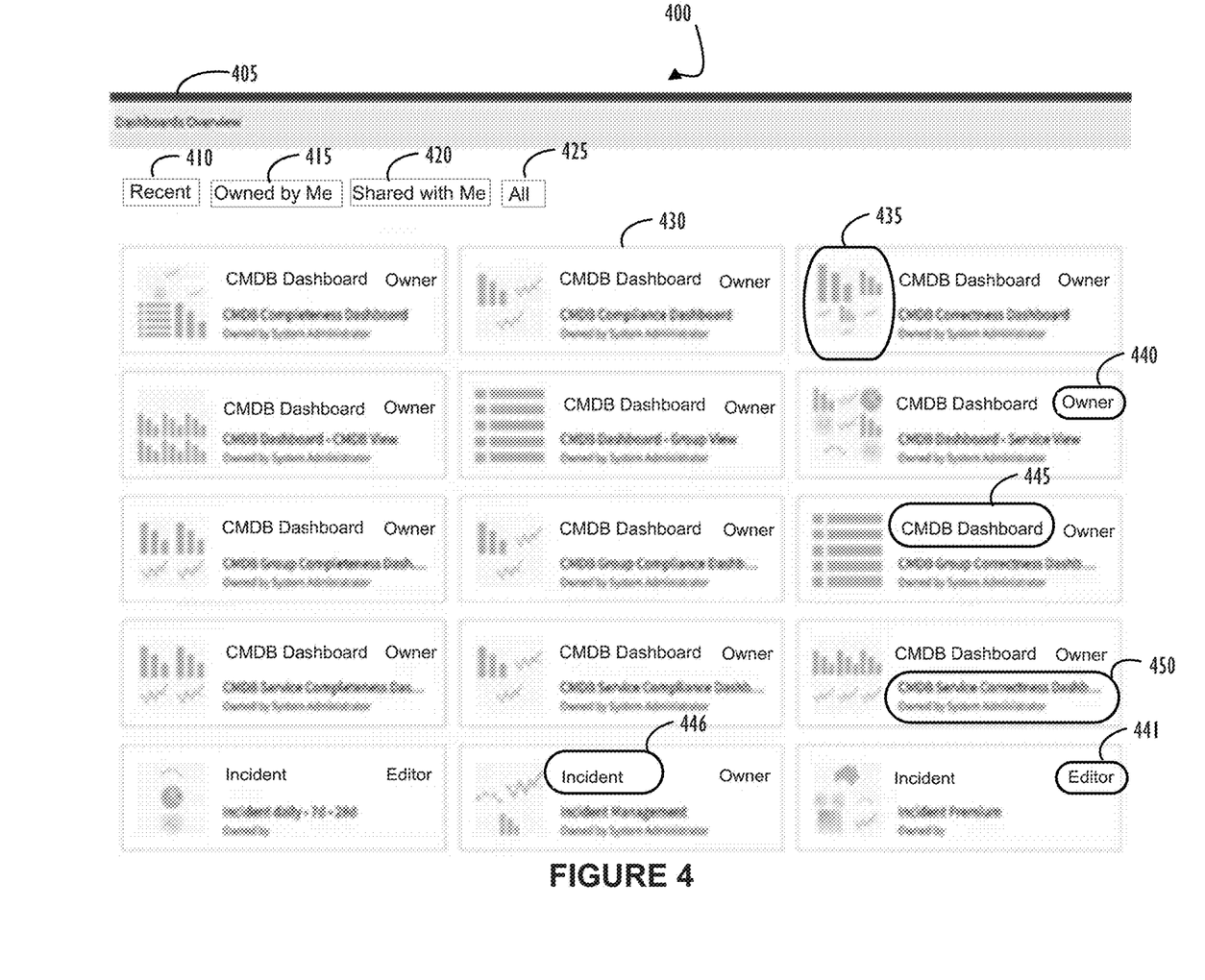
FIG. 4 illustrates a screen shot 400 of an example interface screen as may be shown to an end-user utilizing a dashboard overview capability according to one or more disclosed embodiments.
Figure 5:
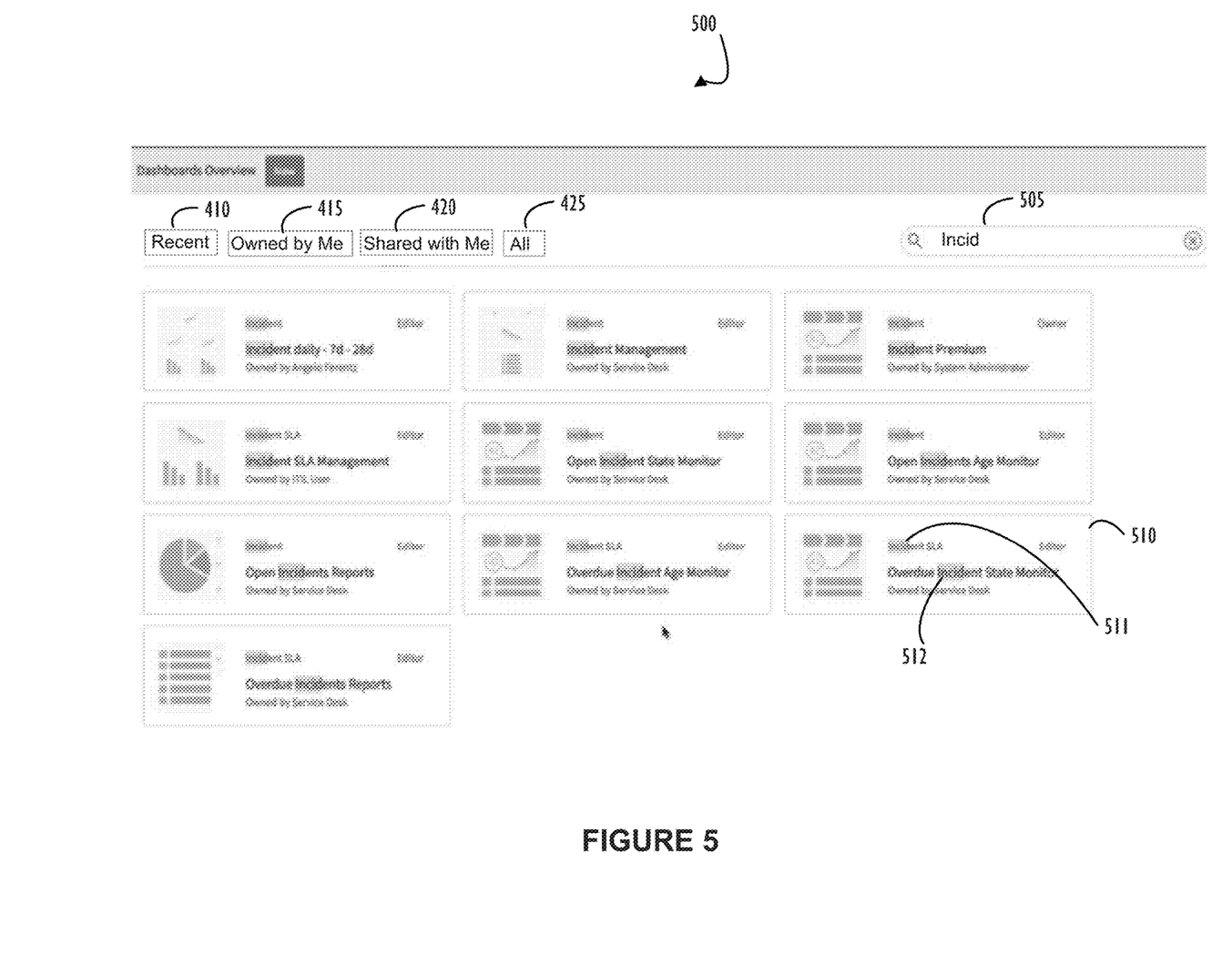
FIG. 5 illustrates a screen shot 500 of an example interface screen as may be shown to an end-user utilizing a dashboard search capability according to one or more disclosed embodiments.

Referring now to FIG. 4, screen shot 400 illustrates an example interface screen as may be shown to an end-user utilizing a dashboard overview capability according to one or more disclosed embodiments. Screen shot 400 may represent a landing page for a dashboard overview capability as described in the different embodiments herein. Dashboard overview page 405 includes, in this example, four selection boxes to aid in navigation across groups of dashboards. Tab or button 410 displays, when selected, recent dashboards that a user has viewed and may represent a default criteria for initial presentation of dashboard overview page 405. Tab or button 415 "Owned by me" may initiate, when selected, presentation of a card tile info representation 430 of all dashboards owned by the current user. Tab or button 420 "Shared with Me" may initiate, when selected, presentation of a card tile info representation 430 of all dashboards currently shared with the current user. Tab or button 425 "All" may initiate, when selected, presentation of a card tile info representation 430 of all dashboards that the current user has permissions to access. Card tile info representation 430 may include multiple elements, which for clarity are identified across different card tile info representations in screen shot 400. Element 435 identifies a thumbnail portion of card tile info representation 430. Element 440 identifies a role/permission associated with the dashboard underlying a card tile info representation. For example, owner as shown in element 440 or editor as shown in element 441. An additional role could include editor (not shown). Element 445 identifies a type of underlying dashboard. In this example, there are two types of dashboards including CMDB dashboard, as shown in element 445, and Incident dashboard, as shown in element 446. Of course, there could be many different types of dashboards and dashboard type may be an organizational method utilized in different ways by different enterprises. Finally, element 450 identifies an area of the card tile info representation where a title of the underlying dashboard may be presented. Note that some information may not completely fit within the card tile info representation and has been abbreviated. In some embodiments, hovering the cursor over the card tile info representation may cause the system to display a pop-up dialog with further details.

Referring now to FIG. 5, screen shot 500 illustrates one example interface screen as may be shown to an end-user utilizing a dashboard search capability according to one or more disclosed embodiments. Many elements from screen shot 400 are repeated in screen shot 500 and maintain their already defined reference element number. For clarity, on both screen shots 400 and 500 not all like elements have been given a repetitive reference number. Screen shot 500 includes a search string entry box 505 containing, in this example, the string "Incid." Responsive to the search string, only card tile info representations containing that search string are presented. See card tile info representation 510 and elements 511 and 512 that identify where the string "Incid" is included in the card tile info representation. It is not necessary that the search string appear more than one time in order for the card tile info representation to be included in the search results.

Figure 6:
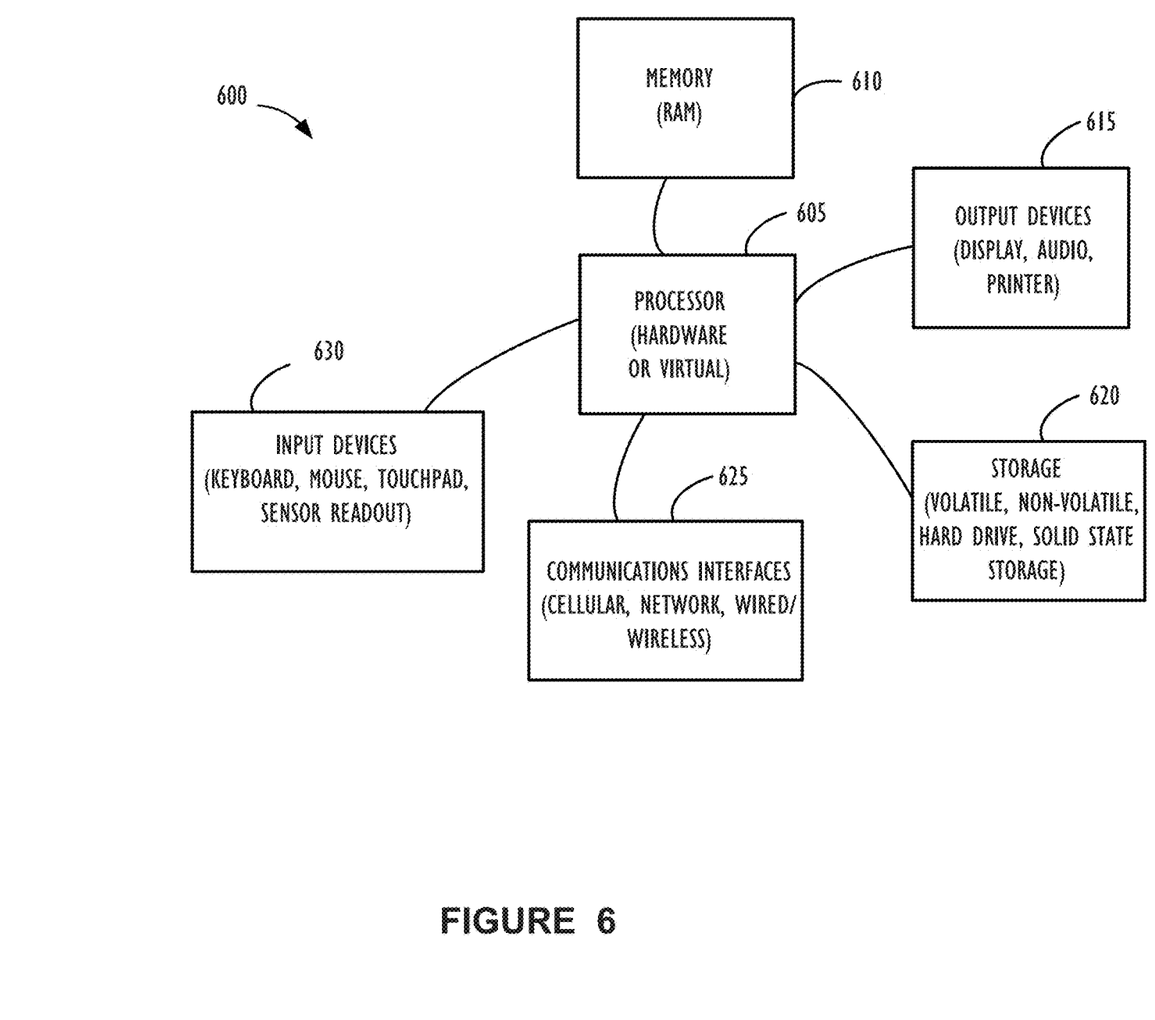
FIG. 6 illustrates a high-level block diagram 600 of a processing device (computing system) that may be used to implement one or more disclosed embodiments.

FIG. 6 illustrates a high-level block diagram 600 of a processing device (computing system) that may be used to implement one or more disclosed embodiments (e.g., service provider cloud infrastructure 110, client devices 104A-104E, server instances 16, data centers 206A-206B, etc.). For example, computing device 600, illustrated in FIG. 6, could represent a client device or a physical server device and could include either hardware or virtual processor(s) depending on the level of abstraction of the computing device. In some instances (without abstraction) computing device 600 and its elements as shown in FIG. 6 each relate to physical hardware and in some instances one, more, or all of the elements could be implemented using emulators or virtual machines as levels of abstraction. In any case, no matter how many levels of abstraction away from the physical hardware, computing device 600 at its lowest level may be implemented on physical hardware. As also shown in FIG. 6, computing device 600 may include one or more input devices 630, such as a keyboard, mouse, touchpad, or sensor readout (e.g., biometric scanner) and one or more output devices 615, such as displays, speakers for audio, or printers. Some devices may be configured as input/output devices also (e.g., a network interface or touchscreen display). Computing device 600 may also include communications interfaces 625, such as a network communication unit that could include a wired communication component and/or a wireless communications component, which may be communicatively coupled to processor 605. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 6, processing device 600 includes a processing element, such as processor 605, that contains one or more hardware processors, where each hardware processor may have a single or multiple processor cores. In one embodiment, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory medium configured to store various types of data. For example, memory 610 may include one or more storage devices 620 that comprise a non-volatile storage device and/or volatile memory. Volatile memory, such as random access memory (RAM), can be any suitable non-permanent storage device. The non-volatile storage devices 620 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 620 may be used to store overflow data if allocated RAM is not large enough to hold all working data. The non-volatile storage devices 620 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600.

A user interface (e.g., output devices 615 and input devices 630) can include a display, positional input device (such as a mouse, touchpad, touchscreen, or the like), keyboard, or other forms of user input and output devices. The user interface components may be communicatively coupled to processor 605. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. No. 62/501,646; 62/501,657; 62/502,258; 62/502,308; and 62/502,244 are hereby incorporated by reference.

What is claimed is:

1. A cloud-based computer system, comprising:
   a memory partition;
   a network interface communicatively coupled to one or more processing units and the memory partition, wherein the memory partition comprises computer instructions that when executed by the one or more processing units cause the cloud-based computer system to:
   provide, via the network interface, a hosted client instance to communicatively couple with a remote client device, the hosted client instance including a plurality of dashboard definitions and a plurality of user accounts;
   receive a request, originating from the remote client device, to display a dashboard overview display, the request associated with a current user account of the plurality of user accounts, the dashboard overview display comprising a directory of categorized dashboards associated the current user account, wherein each dashboard of the directory of categorized dashboards comprises a plurality of widgets that provide visual presentations of performance measures and data analysis;
   obtain, in response to the request, a first set of dashboards owned by the current user account, a second set of dashboards shared with the current user account, and a third set of dashboards recently displayed by the current user account, wherein the directory of categorized dashboards includes the first, second, and third sets of dashboards;
   determine one or more metrics associated with usage of at least one dashboard of the categorized dashboards, wherein in response to determining that a frequency of the usage of the at least one dashboard is less than a threshold frequency, automatically delete the at least one dashboard; and
   display a plurality of card tile information representations, each card tile information representation corresponding to a respective dashboard definition of the plurality of dashboard definitions and at least one of the first, second, and third sets of dashboards, wherein each card tile information representation comprises a respective automatically generated graphical summary of information defined in the respective dashboard definition of the plurality of dashboard definitions, information regarding control attributes of the respective dashboard definition of the plurality of dashboard definitions, and an indication of a role associated with a user of the respective dashboard definition of the plurality of dashboard definitions, wherein the role comprises an owner, an editor, or both.

2. The cloud-based computer system of claim 1, wherein the control attributes for each respective dashboard definition of the plurality of dashboard definitions comprise a title, an owner, and a type.

3. The cloud-based computer system of claim 1, wherein selecting a first card tile information representation from the plurality of card tile information representations initiates display of a dashboard corresponding to the respective dashboard definition of the plurality of dashboard definitions.

4. The cloud-based computer system of claim 1, wherein hovering over a first card tile information representation from the plurality of card tile information representations initiates display of a pop-up dialog containing information about a dashboard corresponding to the respective dashboard definition of the plurality of dashboard definitions.

5. The cloud-based computer system of claim 1, wherein the dashboard overview display is configured to define parameters to share a dashboard with at least one additional user.

6. The cloud-based computer system of claim 1, wherein the dashboard overview display is configured to define parameters to share a dashboard with at least one group of users.

7. The cloud-based computer system of claim 1, comprising instructions to cause the cloud-based computer system to:
   receive a search string for use as a filter to apply to the plurality of card tile information representations;

apply the filter to the dashboard overview display to display only a subset of the plurality of card tile information representations matching the search string; and identify where the search string is displayed within a card tile information representation of the plurality of card tile information representations.

8. The cloud-based computer system of claim 7, wherein the subset of the plurality of card tile information representations matching the search string comprises only card tile information representations matching a title of a dashboard or a type of a dashboard.

9. The cloud-based computer system of claim 1, wherein the automatically generated graphical summary of information is represented as a thumbnail on each card tile information representation.

10. The cloud-based computer system of claim 9, wherein the thumbnail comprises information depicting at least two widget types.

11. The cloud based computer system of claim 10, wherein the at least two widget types correspond to widget types contained within an upper portion of a dashboard display corresponding to the respective dashboard definition of the plurality of dashboard definitions.

12. The cloud-based computer system of claim 1, wherein the one or more metrics comprise the frequency of the usage, time of last use, number of viewers, or age, or any combination thereof of the at least one dashboard of the categorized dashboards.

13. The cloud-based computer system of claim 1, comprising instructions to cause the cloud-based computer system to:

receive a selection of a particular card tile information representation of the plurality of card tile information representations, wherein the particular card tile information representation corresponds to a particular dashboard;

receive one or more inputs making a change to a layout of the particular dashboard; and automatically generate an updated card tile information representation for the particular dashboard reflecting the change to the layout of the particular dashboard.

14. A non-transitory computer readable medium storing instructions that when executed by a processor cause the processor to configure a computer system to:

provide a hosted client instance to communicatively couple with a remote client device, the hosted client instance including a plurality of dashboard definitions and a plurality of user accounts;

receive a request to display a dashboard overview display, the dashboard overview display comprising a directory of categorized dashboards associated with a current user account and a first end-user device, wherein each dashboard of the directory of categorized dashboards comprises a plurality of widgets that provide visual presentations of performance measures and data analysis;

obtain, in response to the request, a first set of dashboards owned by the current user account, a second set of dashboards shared with the current user account, and a third set of dashboards recently displayed by the current user account, wherein the directory of categorized dashboards includes the first, second, and third sets of dashboards; and display a plurality of card tile information representations on the first end-user device, each card tile information representation corresponding to a respective dashboard definition of the plurality of dashboard definitions and associated with a dashboard included in at least one of the first, second, and third sets of dashboards, wherein each card tile information representation comprises a respective automatically generated graphical summary of information defined in the respective dashboard definition of the plurality of dashboard definitions, and information regarding control attributes of the respective dashboard definition of the plurality of dashboard definitions, and an indication of a role associated with a user of the respective dashboard definition of the plurality of dashboard definitions, wherein the role comprises an owner, an editor, or both.

15. The non-transitory computer readable medium of claim 14, wherein the control attributes for each respective dashboard definition of the plurality of dashboard definitions comprise a title, the owner, and a type.

16. The non-transitory computer readable medium of claim 14, wherein selecting a first card tile information representation from the plurality of card tile information representations initiates display of a dashboard associated with the first card tile information representation.

17. The non-transitory computer readable medium of claim 14, wherein hovering over a first card tile information representation from the plurality of card tile information representations initiates display of a pop-up dialog containing information about a dashboard associated with the first card tile information representation.

18. The non-transitory computer readable medium of claim 14, wherein the dashboard overview display comprises the directory of categorized dashboards, and wherein the dashboard overview display is configured to define parameters to share a dashboard with at least one additional user.

19. The non-transitory computer readable medium of claim 14, comprising instructions to cause the computer system to:

receive a search string for use as a filter to apply to the plurality of card tile information representations;

apply the filter to the dashboard overview display to display only a subset of the plurality of card tile information representations matching the search string; and identify where the search string is displayed within a card tile information representation of the plurality of card tile information representations.

20. The non-transitory computer readable medium of claim 14, comprising instructions to cause the computer system to:

receive a selection of a particular card tile information representation of the plurality of card tile information representations, wherein the particular card tile information representation corresponds to a particular dashboard;

receive one or more inputs making a change to a layout of the particular dashboard; and automatically generate an updated card tile information representation for the particular dashboard reflecting the change to the layout of the particular dashboard.

* * * * *